US011898374B2

(12) United States Patent
Snodgrass

(10) Patent No.: US 11,898,374 B2
(45) **Date of Patent: *Feb. 13, 2024**

(54) MOTORIZED ELECTRIC STRIKE

(71) Applicant: Schlage Lock Company LLC, Carmel, IN (US)

(72) Inventor: John A. Snodgrass, Indianapolis, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/973,026

(22) Filed: Oct. 25, 2022

(65) Prior Publication Data

US 2023/0258024 A1 Aug. 17, 2023

Related U.S. Application Data

(63) Continuation of application No. 16/423,985, filed on May 28, 2019, now Pat. No. 11,479,990, which is a (Continued)

(51) Int. Cl.
*E05B 47/00* (2006.01)
*E05B 17/00* (2006.01)
(Continued)

(52) U.S. Cl.
CPC ...... *E05B 47/0046* (2013.01); *E05B 17/0037* (2013.01); *E05B 17/2011* (2013.01);
(Continued)

(58) Field of Classification Search
CPC ............. E05B 47/0046; E05B 17/0037; E05B 17/2011; E05B 2047/0017;
(Continued)

(56) References Cited

U.S. PATENT DOCUMENTS 3,774,422 A * 11/1973 Hogan ................ E05B 47/0047 70/264
4,211,443 A * 7/1980 Butts ................... E05B 47/0047 292/341.16
(Continued)

*Primary Examiner* — Christine M Mills
*Assistant Examiner* — Faria F Ahmad
(74) *Attorney, Agent, or Firm* — Taft Stettinius & Hollister LLP

(57) ABSTRACT

An exemplary electric strike includes a housing and a keeper pivotally mounted in the housing. The strike also includes a plunger having an extended position and a retracted position, a cage including an aperture, and a locking element movably seated in the aperture. The locking element is engaged with the plunger, and the plunger is structured to urge the locking element radially outward as the plunger moves from an extended position toward a retracted position. The strike also includes a sleeve, a transmission engaged with the sleeve, and a motor drivingly coupled to the transmission. The sleeve is structured to selectively prevent radially outward movement of the locking element and retraction of the plunger. The strike also includes at least one of a lost motion connection and an anti-tamper mechanism.

20 Claims, 13 Drawing Sheets

Related U.S. Application Data continuation of application No. 15/166,913, filed on May 27, 2016, now Pat. No. 10,301,847.

(51) Int. Cl.

| | |
|---|---|
| ***E05B 17/20*** | (2006.01) |
| ***E05B 63/18*** | (2006.01) |
| ***E05B 47/06*** | (2006.01) |
| ***E05C 19/00*** | (2006.01) |
| ***E05B 15/02*** | (2006.01) |

(52) U.S. Cl.

CPC ...... *E05B 47/0012* (2013.01); *E05B 47/0047* (2013.01); *E05B 63/18* (2013.01); *E05B 15/0205* (2013.01); *E05B 47/0607* (2013.01); *E05B 2047/0017* (2013.01); *E05B 2047/0018* (2013.01); *E05B 2047/0068* (2013.01); *E05B 2047/0069* (2013.01); *E05C 19/009* (2013.01); *Y10T 292/696* (2015.04); *Y10T 292/699* (2015.04)

(58) Field of Classification Search

CPC ..... E05B 2047/0018; E05B 2047/0068; E05B 2047/0069; E05B 15/0205; E05B 63/18; E05B 47/0012; E05B 47/0047; Y10T 292/699

See application file for complete search history.

(56) References Cited

U.S. PATENT DOCUMENTS

| | | | | |
|---|---|---|---|---|
| 4,901,544 | A | 2/1990 | Jang | |
| 5,141,355 | A | 8/1992 | Stillwagon | |
| 5,186,516 | A | 2/1993 | Alexander et al. | |
| 5,246,258 | A | 9/1993 | Kerschenbaum et al. | |
| 5,546,777 | A | 8/1996 | Liu et al. | |
| 5,896,765 | A | 4/1999 | Peyre et al. | |
| RE36,351 | E | 10/1999 | Yamamoto et al. | |
| 5,964,487 | A | 10/1999 | Shamblin | |
| 6,082,791 | A * | 7/2000 | Frolov | E05B 47/0047 292/201 |
| 6,662,603 | B2 | 4/2003 | Morris | |
| 6,575,503 | B1 | 6/2003 | Johansson et al. | |
| 6,619,085 | B1 | 9/2003 | Hsieh | |
| 9,222,280 | B2 * | 12/2015 | Mackle | E05B 15/0205 |
| 9,249,821 | B2 | 2/2016 | Halder | |
| 9,476,227 | B2 * | 10/2016 | Scheffler | E05B 47/0046 |
| 9,487,972 | B2 * | 11/2016 | Vetter | G07F 17/3216 |
| 9,613,766 | B2 | 4/2017 | Mangold | |
| 10,301,847 | B2 * | 5/2019 | Snodgrass | E05B 47/0046 |
| 11,248,397 | B2 * | 2/2022 | Lee | G07C 9/00309 |
| 2002/0002507 | A1 | 1/2002 | Hatakeyama | |
| 2004/0061343 | A1 * | 4/2004 | Bashford | E05B 47/0047 292/341.16 |
| 2004/0119894 | A1 | 6/2004 | Higgins et al. | |
| 2006/0170533 | A1 | 8/2006 | Chioiu et al. | |
| 2006/0226663 | A1 | 10/2006 | Liao | |
| 2007/0050259 | A1 | 3/2007 | Wesley | |
| 2007/0130476 | A1 | 6/2007 | Mohanty | |
| 2007/0290789 | A1 | 12/2007 | Segev et al. | |
| 2008/0261560 | A1 | 10/2008 | Ruckart | |
| 2009/0259957 | A1 | 10/2009 | Slocum et al. | |
| 2009/0267361 | A1 | 10/2009 | Alber | |
| 2010/0017736 | A1 | 1/2010 | Kim | |
| 2010/0096864 | A1 | 4/2010 | Webb et al. | |
| 2010/0116006 | A1 | 5/2010 | Huang et al. | |
| 2010/0127518 | A1 | 5/2010 | Huang | |
| 2010/0138764 | A1 | 6/2010 | Hatambeiki et al. | |
| 2010/0229194 | A1 | 9/2010 | Blanchard et al. | |
| 2010/0289279 | A1 | 11/2010 | Toma | |
| 2010/0298032 | A1 | 11/2010 | Lee et al. | |
| 2011/0031768 | A1 | 2/2011 | Scheffler et al. | |
| 2011/0202415 | A1 | 8/2011 | Cesares et al. | |
| 2011/0246904 | A1 | 10/2011 | Pinto et al. | |
| 2012/0068817 | A1 | 3/2012 | Fisher | |
| 2012/0072944 | A1 | 3/2012 | Felt et al. | |
| 2012/0091736 | A1 | 4/2012 | Dammers et al. | |
| 2012/0095791 | A1 | 4/2012 | Stefik et al. | |
| 2012/0100868 | A1 | 4/2012 | Kim et al. | |
| 2012/0287058 | A1 | 11/2012 | Lee | |
| 2013/0009409 | A1 | 1/2013 | Chang | |
| 2013/0031261 | A1 | 1/2013 | Suggs | |
| 2013/0088023 | A1 | 4/2013 | Singh | |
| 2013/0088024 | A1 | 4/2013 | Mackle | |
| 2013/0165180 | A1 | 6/2013 | Fukuda Kelley et al. | |
| 2013/0324237 | A1 | 12/2013 | Adiraju et al. | |
| 2014/0007222 | A1 | 1/2014 | Qureshi et al. | |
| 2014/0353983 | A1 | 12/2014 | Vetter et al. | |
| 2015/0115629 | A1 | 4/2015 | Gartner | |
| 2015/0167351 | A1 | 6/2015 | Singh et al. | |
| 2016/0160534 | A1 | 6/2016 | Buchanan | |
| 2017/0342742 | A1 | 11/2017 | Snodgrass | |

* cited by examiner

MOTORIZED ELECTRIC STRIKE

CROSS REFERENCE TO RELATED APPLICATIONS

The present application is a continuation of U.S. patent application Ser. No. 16/423,985 filed May 28, 2019 and issued as U.S. Pat. No. 11,479,990, which is a continuation of U.S. patent application Ser. No. 15/166,913 filed May 27, 2016 and issued as U.S. Pat. No. 10,301,847, the contents of each application are incorporated herein by reference in their entirety.

TECHNICAL FIELD

The present disclosure generally relates to electric strikes, and more particularly but not exclusively relates to motor-driven electric strikes.

BACKGROUND

Electric strikes are occasionally used to control access through a door. Some such systems have certain limitations, such as power consumption and resistance to tampering. Therefore, a need remains for further improvements in this technological field.

SUMMARY

An exemplary electric strike includes a housing and a keeper pivotally mounted in the housing. The strike also includes a plunger having an extended position and a retracted position, a cage including an aperture, and a locking element movably seated in the aperture. The locking element is engaged with the plunger, and the plunger is structured to urge the locking element radially outward as the plunger moves from an extended position toward a retracted position. The strike also includes a sleeve, a transmission engaged with the sleeve, and a motor drivingly coupled to the transmission. The sleeve is structured to selectively prevent radially outward movement of the locking element and retraction of the plunger. The strike also includes at least one of a lost motion connection and an anti-tamper mechanism. Further embodiments, forms, features, and aspects of the present application shall become apparent from the description and figures provided herewith.

DETAILED DESCRIPTION OF ILLUSTRATIVE EMBODIMENTS

Figure 1:
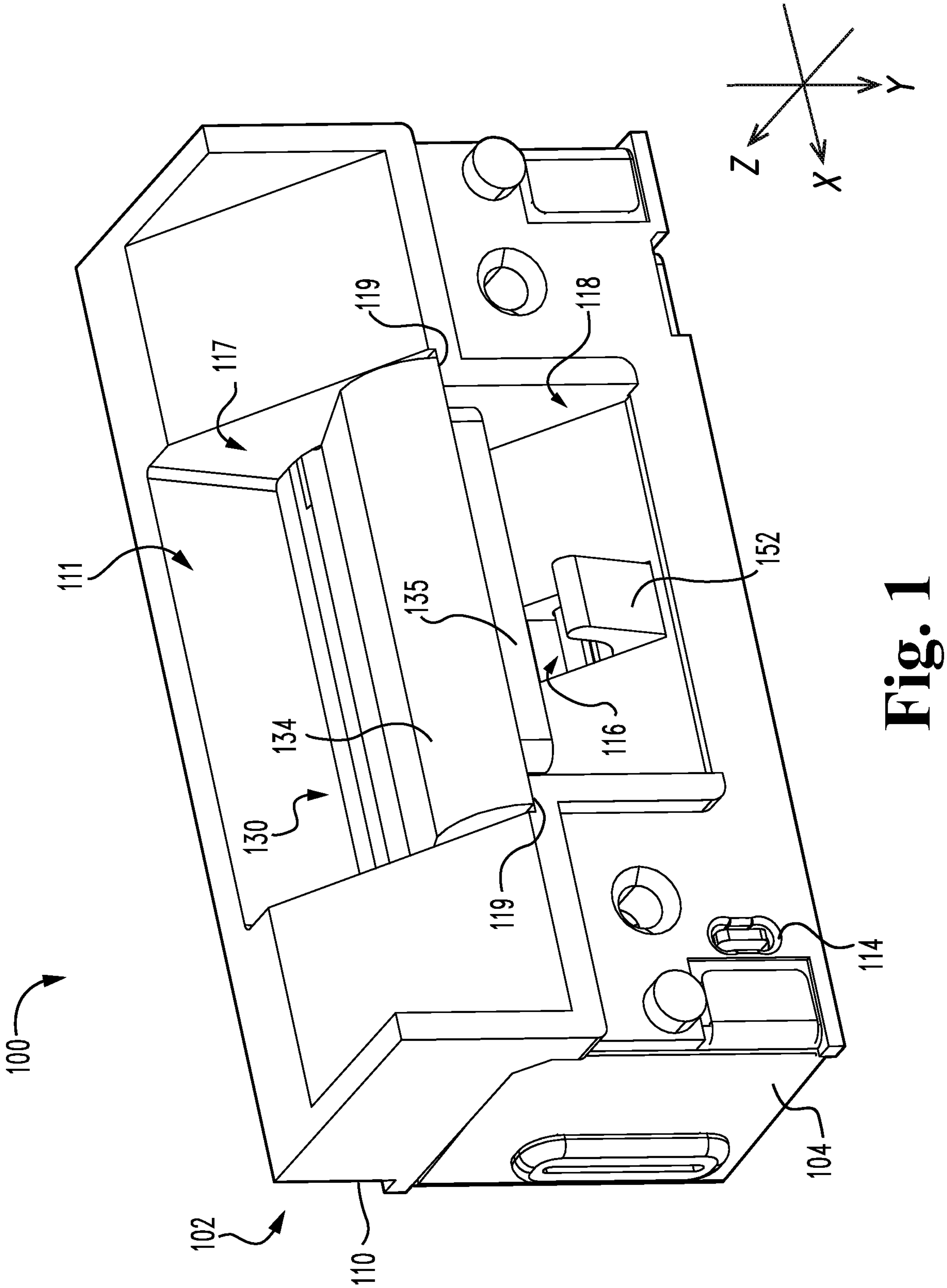
FIG. 1 is a perspective illustration of an electric strike according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of each illustrated axis indicates the positive direction. In the coordinate system illustrated in FIG. 1, the X-axis defines first and second longitudinal directions, the Y-axis defines first and second lateral directions, and the Z-axis defines first and second transverse directions.

Additionally, the descriptions that follow may refer to the directions defined by the axes with specific reference to the orientations illustrated in the Figures. For example, the longitudinal directions may be referred to as "distal" ($X^+$) and "proximal" ($X^-$), the lateral directions may be referred to as "left" ($Y^+$) and "right" ($Y^-$), and the transverse directions may be referred to as "up" ($Z^+$) and "down" ($Z^-$). These terms are used for ease and convenience of description, and are without regard to the orientation of the system with respect to the environment. As such, descriptions that reference a longitudinal direction may be equally applicable to a vertical direction, a horizontal direction, or an off-axis orientation with respect to the environment. For example, when the strike 100 illustrated in FIG. 1 is installed in a door frame, the X-axis may be substantially vertical with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Figure 2:
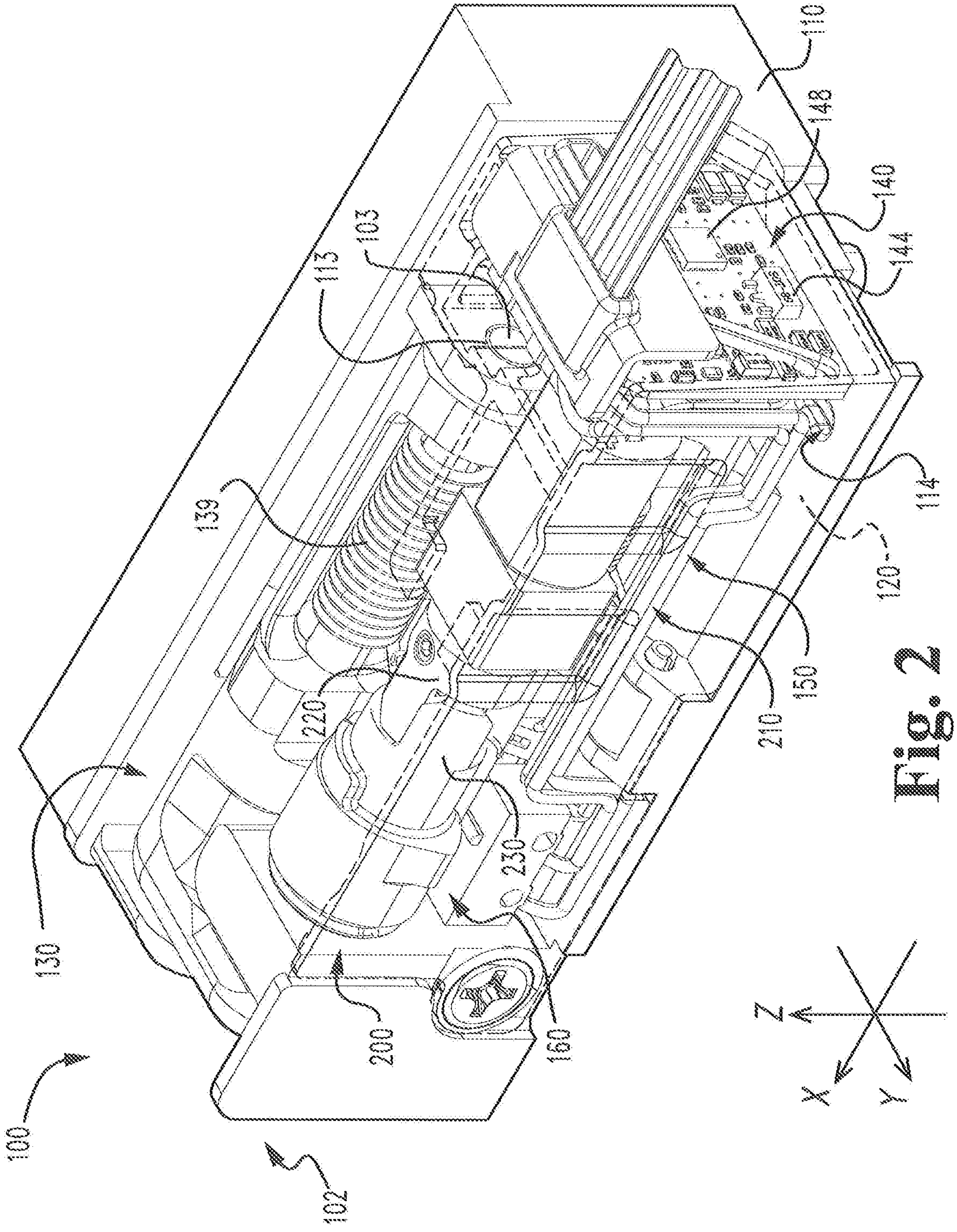
FIG. 2 is a perspective illustration of a portion of the electric strike illustrated in FIG. 1.
Figure 3:
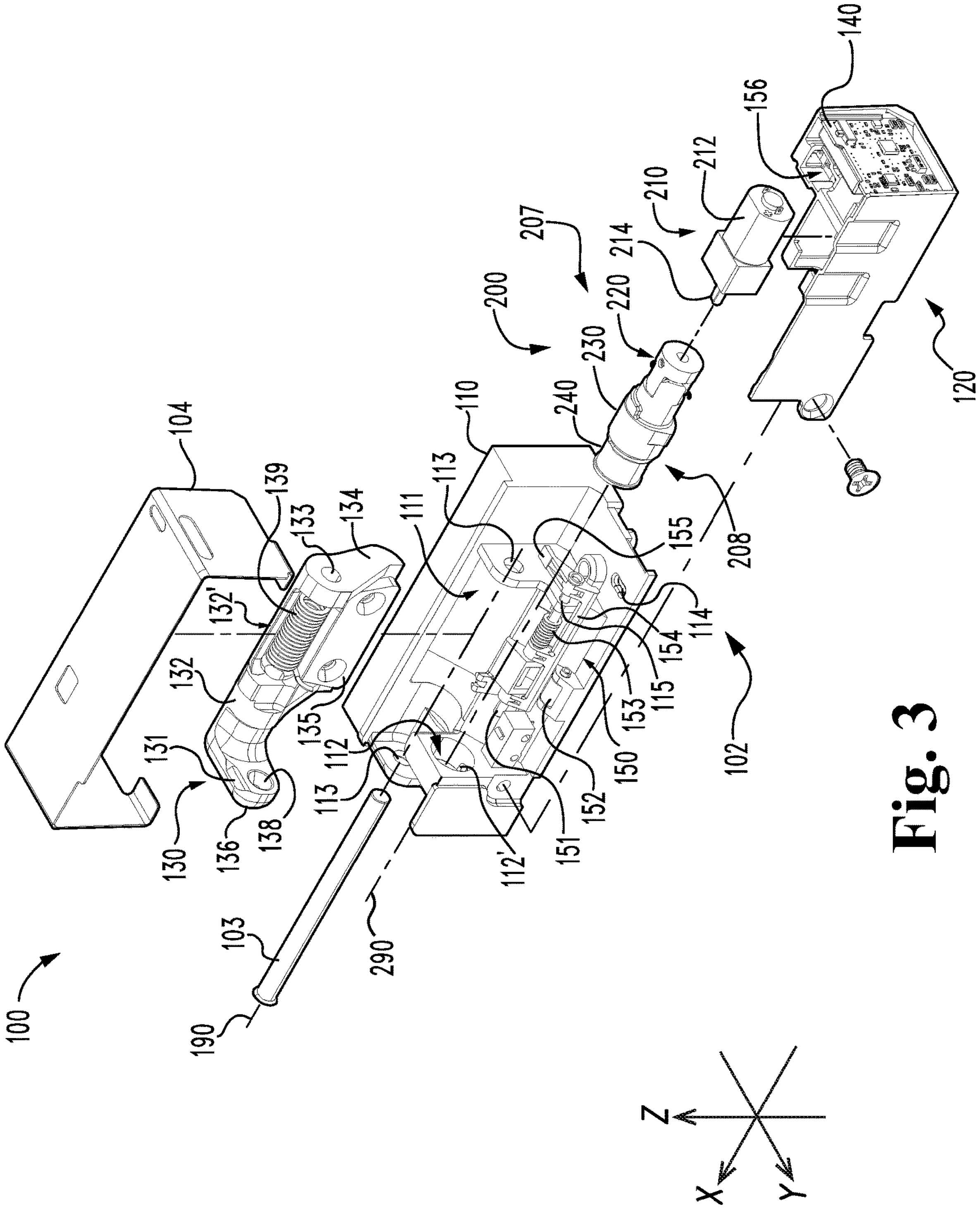
FIG. 3 is an exploded assembly view of the electric strike illustrated in FIG. 1.

With reference to FIGS. 1-3, an electric strike 100 according to one embodiment includes a mounting assembly 102 configured for mounting in a door or a door frame. The mounting assembly 102 includes a housing 110 and a case 120, and may further include a cover 104. The strike 100 further includes a keeper 130, a control assembly 140, a latchbolt detection assembly 150, and an actuating assembly 200, each of which may be housed in or mounted to the mounting assembly 102. The housing 110, case 120, and cover 104 may be releasably coupled with one another to selectively retain the keeper 130, control assembly 140, latchbolt detection assembly 150, and actuating assembly 200 within the strike 100. As described in further detail below, the strike 100 may further include an anti-tamper mechanism 160 structured to mitigate the negative effects of certain tampering events.

The housing 110 includes an outer opening 111, an opening 112 structured to receive a portion of the actuating assembly 200, a pair of longitudinally aligned keeper journal bearings 113, an opening 114 structured to receive an electrical lead of the control assembly 140, a set of longitudinally aligned secondary journal bearings 115, and a tongue opening 116, the functions of each of which are described in further detail below. The outer opening 111 includes a passage 117 and a pocket 118, and the housing 110 includes a pair of ledges 119 which partially define a boundary between the passage 117 and the pocket 118.

The keeper 130 includes a substantially cylindrical body portion 132, a keeper arm 134 extending from the body portion 132, and an engagement arm 136 extending from the body portion 132 at an angle with respect to the keeper arm 134. As described in further detail below, the keeper arm 134 is operable to separate the passage 117 from the pocket 118, and the engagement arm 136 is operable to engage the locking mechanism 207. The body portion 132 includes a longitudinally extending opening 133 operable to receive a pivot pin 103, and a cutout 132' operable to receive a torsion spring 139. The keeper arm 134 may have a pad 135 mounted thereon, and the engagement arm 136 includes a cam surface in the form of a recess 138.

The pivot pin 103 extends along a keeper arm longitudinal axis 190 through the journal bearings 113, the longitudinal opening 133, and the torsion spring 139. As a result, the keeper 130 is pivotally mounted in the housing 110, and the torsion spring 139 biases the keeper 130 toward a closed position. In the closed position (FIG. 1), the keeper arm 134 engages the ledges 119 and separates the passage 117 from the pocket 118. The blocking pad 135 may be received in the pocket 118 when the keeper 130 is in the closed position. As described in further detail below, the strike 100 has a locked state and an unlocked state. In the locked state, the keeper 130 is retained in the closed position, such that the passage 117 and the pocket 118 remain separated. In the unlocked state, the keeper 130 is capable of pivoting to an open position in which the passage 117 and the pocket 118 are connected. Additionally, the actuating assembly 200 is operable to selectively prevent pivoting of the keeper 130 by engagement with the recess 138.

The control assembly 140 includes a controller 142, a lead operable to connect the control assembly 140 to line power or an access control system, and an energy storage device such as a capacitor 144, which may take the form of a super-capacitor. As described in further detail below, the controller 142 is operable to transition the actuating assembly 200 between a locking state and an unlocking state using line power and/or power stored in the energy storage device 144. More specifically, the controller 142 is configured to transition the actuating assembly 200 from a default state to a non-default state using line power, and to transition the actuating assembly 200 from the non-default state to the default state using power stored in the energy storage device 144. The control assembly 140 may further include a mode selector 146 operable to set the default state of the strike 100. The mode selector 146 may be operable to selectively set the strike 100 in a "fail safe" mode and a "fail secure" mode. In the fail safe or electric locking (EL) mode, the default state is the unlocked state, and the non-default state is the locked state. In the fail secure or electric unlocking (EU), the default state is the locked state, and the non-default state is the unlocked state.

The latchbolt detection assembly 150 includes a tongue 152 pivotally mounted to the housing 110, a sensor bar 154 engaged with the tongue 152, and a switch 156 associated with the sensor bar 154. The sensor bar 154 and a torsion spring 153 are pivotally mounted to the housing 110 via a pivot pin 151, which is received in the secondary journal bearings 115. The torsion spring 153 urges the sensor bar 154 into contact with the tongue 152, thereby urging the tongue 152 to an extended position. With the tongue 152 in the extended position, an arm 155 on the sensor bar 154 engages the switch 156, thereby indicating that no latchbolt is received in the pocket 118. When a latchbolt is received in the pocket 118, the latchbolt urges the tongue 152 to a retracted position, thereby causing the sensor bar 154 to pivot against the biasing force of the spring 153. In this pivoted position, an arm 155 of the sensor bar 154 disengages the switch 156, thereby indicating that the latchbolt is received in the pocket 118.

Figure 4:
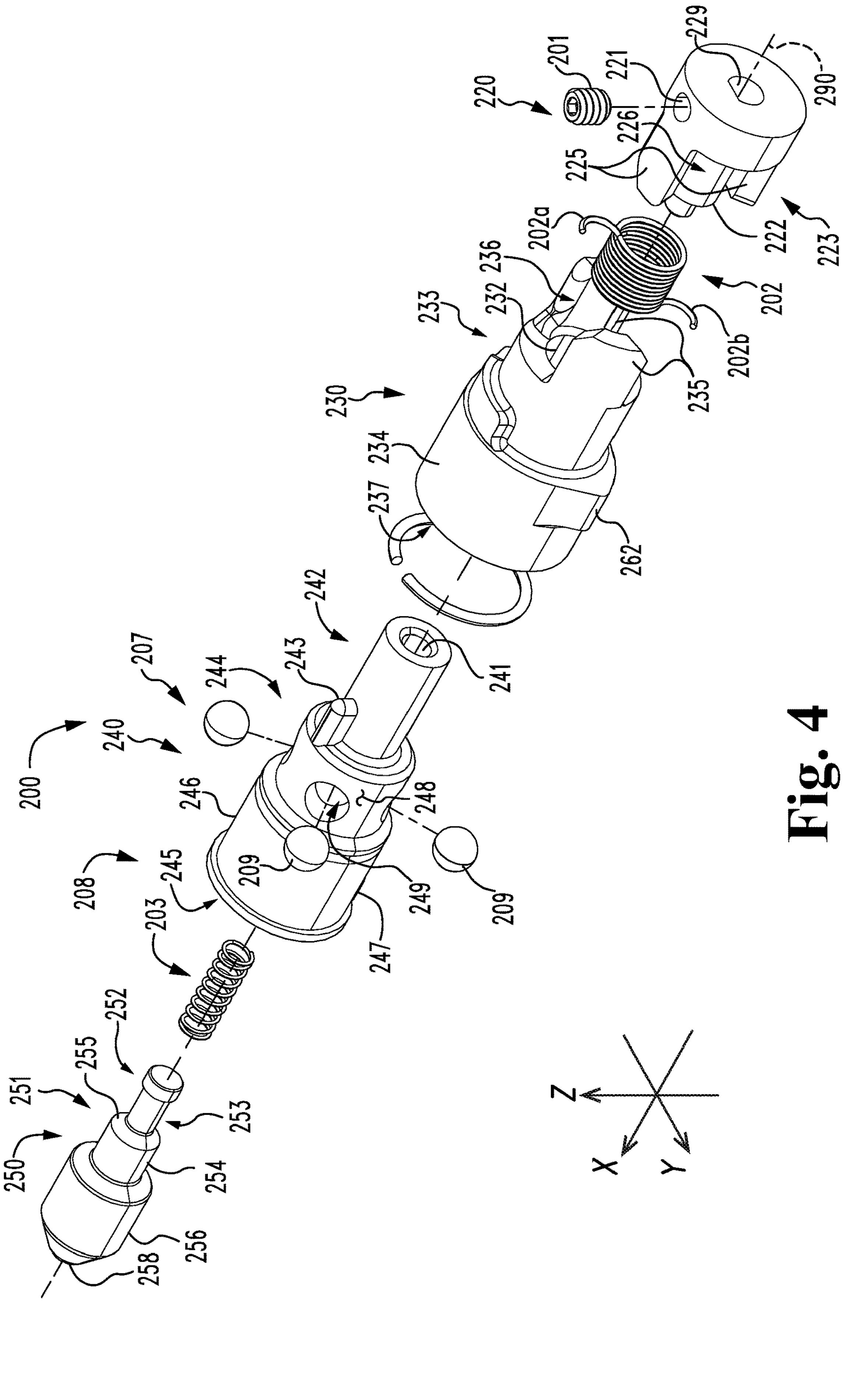
FIG. 4 is an exploded illustration of an actuating assembly of the electric strike illustrated in FIG. 1.
Figure 5:
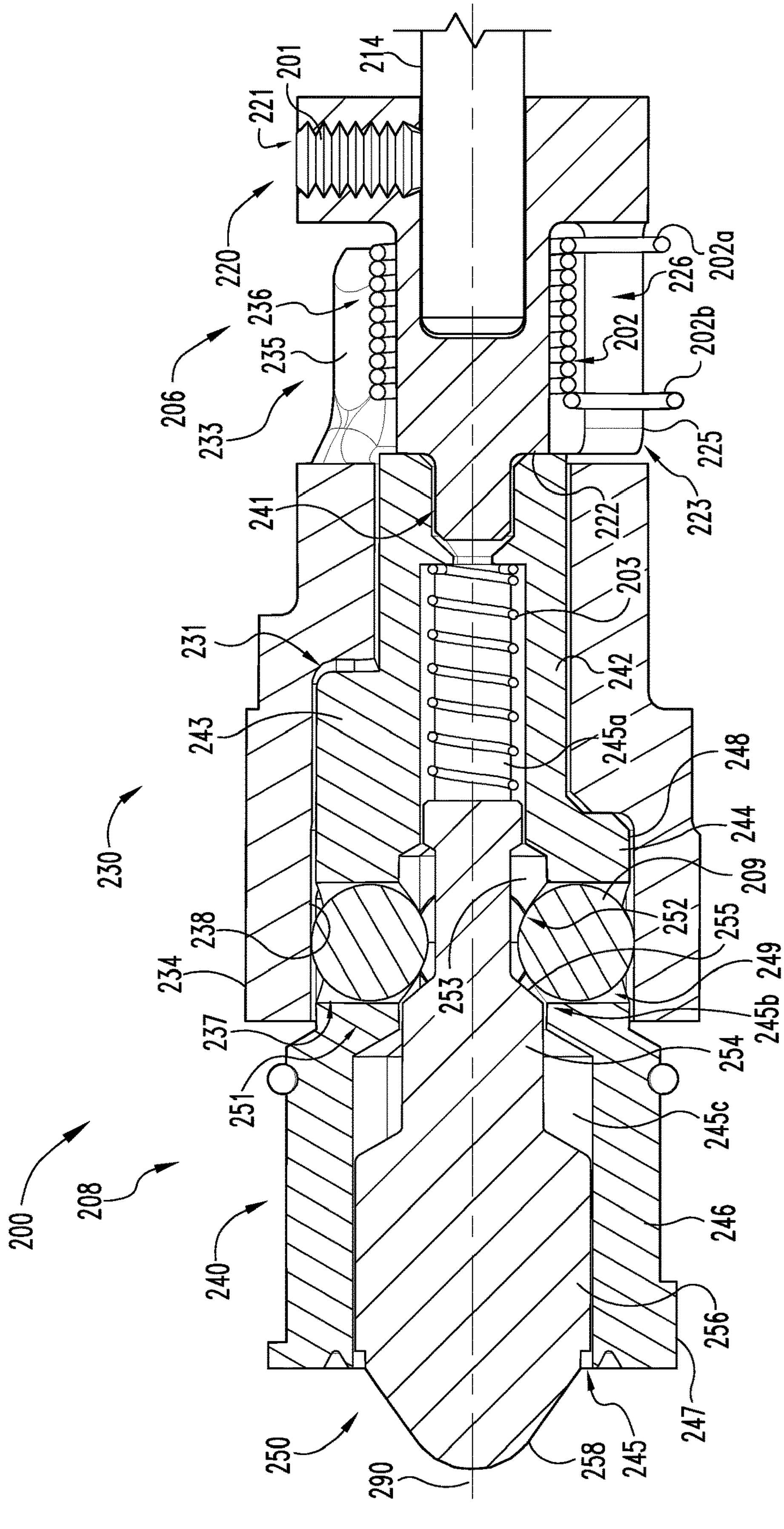
FIG. 5 is a cross-sectional illustration of the actuating assembly illustrated in FIG. 4.

With additional reference to FIGS. 4 and 5, the actuating assembly 200 extends along an actuating assembly longitudinal axis 290, and includes an actuator 210 in communication with the control assembly 140, a transmission 220 driven by the actuator 210, a sleeve 230 engaged with the transmission 220 via a torsion spring 202, a cage 240 partially received within the sleeve 230, and a plunger 250 movably mounted in the cage 240. The actuating assembly 200 also includes a plurality of locking elements 209 movably seated in the cage 240 and engaged with the plunger 250. The actuating assembly 200 may further include a lock status switch 260 operable to detect the locking or unlocking state of the actuating assembly 200, and thus the locked or unlocked state of the strike 100.

As described in further detail below, the plunger 250 has an extended position and a retracted position. The locking elements 209, sleeve 230, and cage 240 are operable to selectively retain the plunger 250 in the extended position, and may therefore be considered a plunger locking assembly or a plunger retention assembly 207. Additionally, the plunger retention assembly 207 and the plunger 250 are operable to selectively lock the keeper 130 in the closed position, and may therefore be considered a keeper locking assembly 208.

The actuator 210 includes a motor 212 operable to rotate a motor shaft 214. In the illustrated form, the motor 212 includes a reduction gearbox which connects an output shaft of the motor 212 to the motor shaft 214, thereby providing the motor shaft 214 with a greater torque and a lower rotational speed than the output shaft. The motor 212 is in communication with the control assembly 140, and is structured to rotate the motor shaft 214 in first and second directions in response to signals from the control assembly 140. As described in further detail below, rotation of the motor shaft 214 in an unlocking direction transitions the actuating assembly 200 to an unlocking state, and rotation of the motor shaft 214 in a locking direction transitions the actuating assembly 200 to a locking state.

The transmission 220 includes an opening 229 operable to receive the motor shaft 214 such that the transmission 220 is rotationally coupled with the motor shaft 214. The transmission 220 includes a forked portion 223 including a pair of prongs 225 and a pair of gaps 226. The prongs 225 extend in the distal ($X^+$) direction, and are angularly separated by the gaps 226. The transmission 220 may further include a post 222 extending along the longitudinal axis 290 of the actuation assembly 200. The transmission 220 is rotatable between a lock-setting position and an unlock-setting position.

The sleeve 230 includes a central opening 232 operable to receive a proximal ($X^-$) end portion of the cage 240. A proximal ($X^-$) portion of the sleeve 230 defines a forked portion 233, and a distal ($X^+$) portion of the sleeve 230 defines a body portion 234. The forked portion 233 includes a pair of prongs 235 and a pair of gaps 236. The prongs 235 extend in the proximal direction, and are angularly separated by the gaps 236. The sleeve 230 also includes a chamber 237, which is formed within the body portion 234 and is connected to the central opening 232. The chamber 237 includes an inner surface 238 and a plurality of recesses 239. Additionally, a channel 231 extends distally from a proximal ($X^-$) end of the chamber 237. The channel 231 has an angular span about the longitudinal axis 290, and may therefore be referred to as an angular channel 231. The sleeve 230 is rotatable between a locking position which defines a locking state of the locking assembly 208, and an unlocking position which defines an unlocking state of the locking assembly 208. The sleeve 230 may further include a protrusion 262 structured to engage the lock status switch 260 when the sleeve 230 is in a locking position.

The cage 240 includes a stem 242, a body portion 244 positioned on a distal ($X^+$) side of the stem 242, and a sleeve portion 246 positioned on a distal ($X^+$) side of the body portion 244. The body portion 244 is received within the chamber 237 of the sleeve 230, and the stem 242 is received in the central opening 232 of the sleeve 230. A proximal end of the stem 242 includes a bearing opening 241 configured to receive a distal end of the post 222 such that the post 222 is rotatably supported by the stem 242. The cage 240 defines a cage chamber 245 including a proximal portion 245*a* formed in the stem 242, an intermediate portion 245*b* formed in the body portion 244, and a distal portion 245*c* formed in the sleeve portion 246. The body portion 244 includes an outer surface 248 and a plurality of apertures 249 extending radially outward from the cage chamber 245 to the outer surface 248, thereby connecting the cage chamber 245 and the sleeve chamber 237. Additionally, each of the locking elements 209 is movably received in a corresponding one of the apertures 249. In the illustrated form, the locking elements 209 are provided in the form of spheres. It is also contemplated that the locking elements 209 may be provided in another form, such as cylindrical rollers.

The cage 240 also includes a proximal spline 243 extending proximally from the body portion 244 along the stem 242, and a distal spline 247 protruding radially from the sleeve portion 246. The proximal spline 243 is received in the angular channel 231, and limits rotation of the sleeve 230 with respect to the cage 240. The sleeve portion 246 is received in the opening 112 with the distal spline 247 received in a slot 112' formed in the opening 112 such that engagement between the distal spline 247 and the slot 112' prevents the cage 240 from rotating with respect to the housing 110.

The plunger 250 includes a stem 251 including a reduced diameter portion 252 having a circumferential channel 253, and an enlarged diameter portion 254 positioned on a distal side of the reduced diameter portion 252. The stem 251 also includes a ramp 255 extending distally and radially outward from a floor of the circumferential channel 253 to the enlarged diameter portion 254. The plunger 250 also includes a body portion 256 positioned on a distal side of the stem 251 and a tapered nose 258 extending distally from the body portion 256. As described in further detail below, the nose 258 is operable to engage the recess 138 of the keeper 130.

Figure 7A:
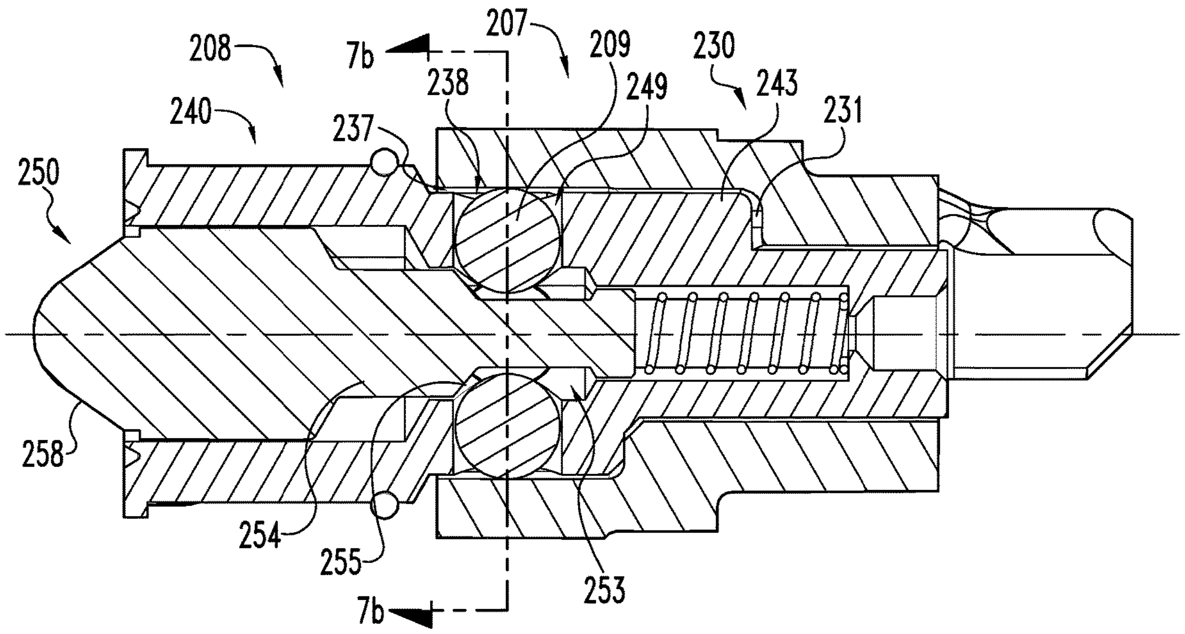
FIGS. 7*a* and 7*b* are cross-sectional illustrations of the actuating assembly in the locking state.
Figure 8A:
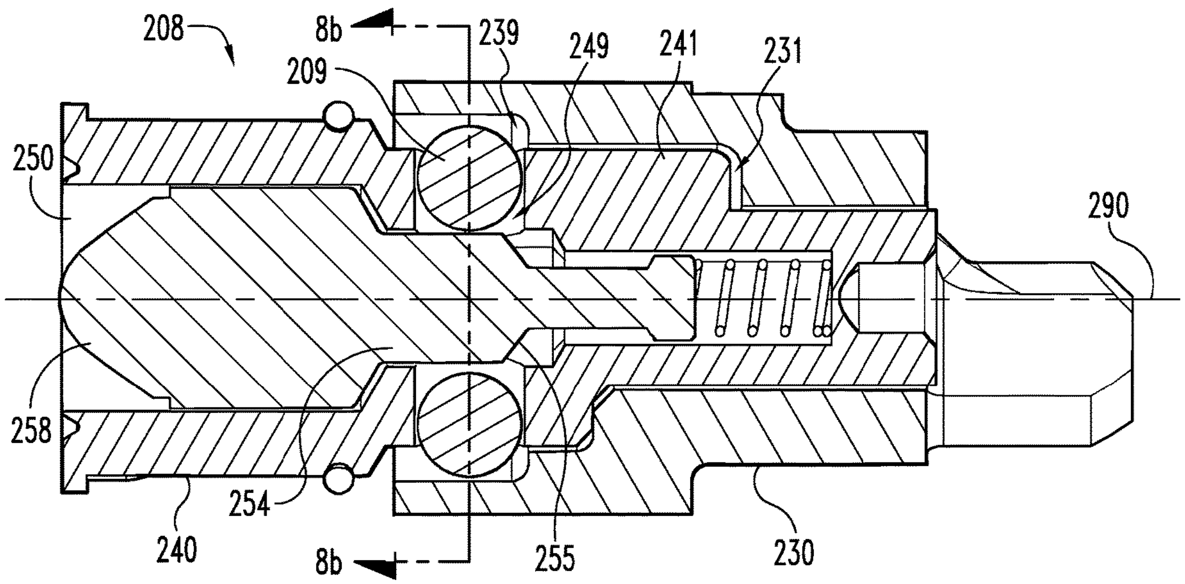
FIGS. 8*a* and 8*b* are cross-sectional illustrations of the actuating assembly in the unlocking state.

The plunger 250 is movably seated in the cage chamber 245. More specifically, the body portion 256 is received in the cage chamber distal portion 245*c*, and the stem 251 extends through the intermediate portion 245*b* and into the proximal portion 245*a*. The plunger 250 has an extended or distal position (FIG. 7*a*) and a retracted or proximal position (FIG. 8*a*), and is biased toward the extended position. For example, a spring 203 may be engaged with a proximal end of the stem 251 to distally bias the plunger 250 toward the extended position. In the extended position, the nose 258 extends beyond the distal end of the cage 240, and the circumferential channel 253 is aligned with the apertures 249. In the retracted position, the nose 258 is at least partially received in the cage chamber 245, and the enlarged diameter portion 254 is aligned with the apertures 249.

Figure 6A:
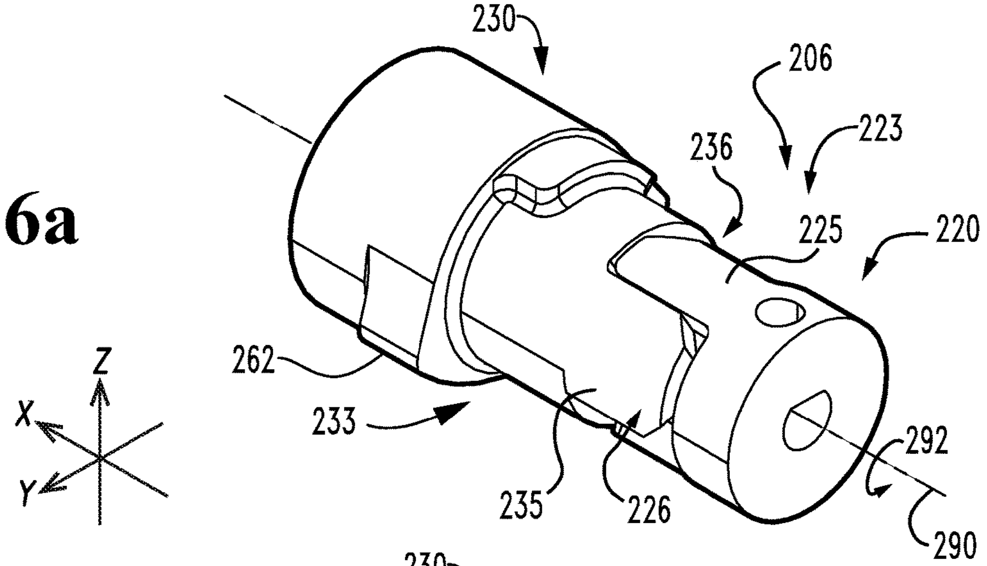
FIGS. 6*a*-6*c* are perspective illustrations of the actuating assembly in a locking state, an unlocking state, and a transitional state, respectively.

With additional reference to FIG. 6, the forked portions 223, 233 of the transmission 220 and the sleeve 230 define a lost rotational motion connection 206 between the transmission 220 and the sleeve 230. FIG. 6*a* illustrates the lost motion connection 206 in a first or lock-setting state, which includes the lock-setting position of the transmission 220 and the locking position of the sleeve 230. In this state, the protrusion 262 is disengaged from the lock status switch 260, thereby indicating that the sleeve 230 is in the locking position. Additionally, the prongs 225, 235 are engaged with one another such that rotation of the transmission 220 in an unlocking direction 292 causes a corresponding rotation of the sleeve 230 in the unlocking direction 292. As such, the sleeve 230 rotates from the locking position to the unlocking position in response to rotation of the transmission 220 from the lock-setting position to the unlock-setting position.

Figure 6B:
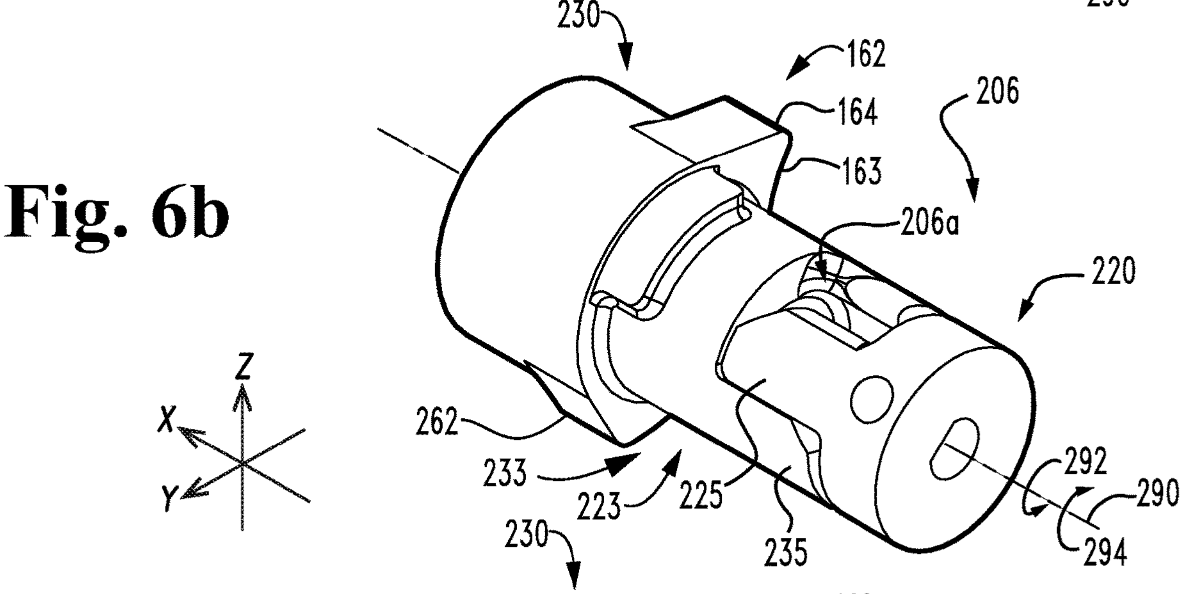

FIG. 6*b* illustrates the lost motion connection 206 in a second or unlock-setting state, which includes the unlock-setting position of the transmission 220 and the unlocking position of the sleeve 230. In this state, the protrusion 262 is engaged with the lock status switch 260, thereby indicating that the sleeve 230 is in the unlocking position. Additionally, a first lost motion gap 206*a* is formed between the prongs 225, 235, and the first engagement feature 162 faces the keeper 130. As a result of the first lost motion gap 206*a*, the transmission 220 is free to rotate in a locking direction 294 toward the lock-setting position. As described in further detail below, the anti-tamper mechanism 160 is operable to selectively retain the sleeve 230 in the unlocking position. When the sleeve 230 is free to return to the locking position, rotation of the transmission 220 in the locking direction 294 causes the sleeve 230 to rotate to the locking position, thereby moving the lost motion connection 206 to the first or lock-setting state (FIG. 6*a*). When the sleeve 230 is retained in the unlocking position by the anti-tamper mechanism 160, rotation of the transmission 220 to the lock-setting position moves the lost motion connection 206 to a transitional state.

Figure 6C:
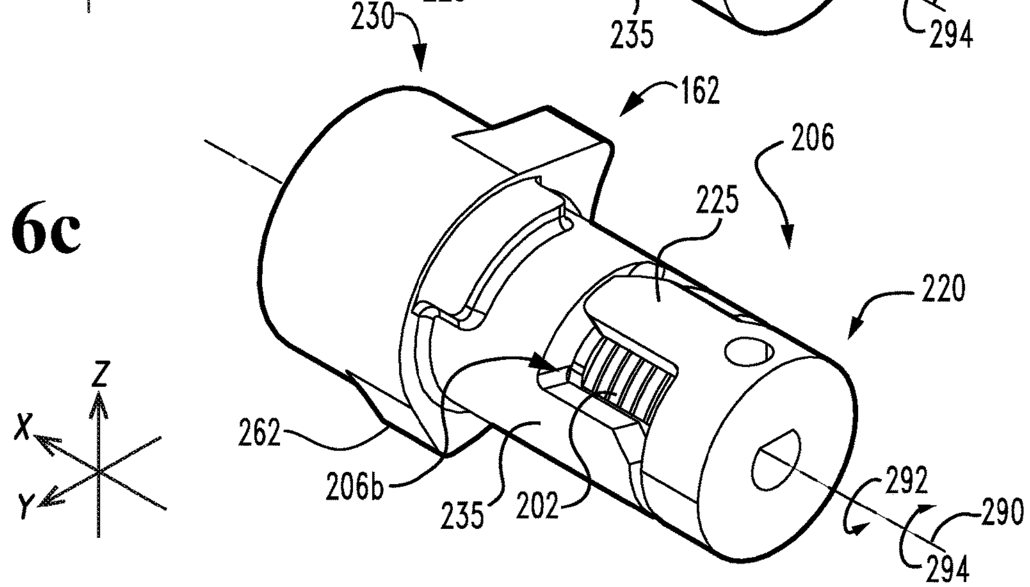

FIG. 6*c* illustrates the lost motion connection 206 in a third or transitional state, which includes the lock-setting position of the transmission 220 and the unlocking position of the sleeve 230. In this state, the torsion spring 202 has been deformed such that mechanical energy is stored therein. Additionally, a second lost motion gap 206*b* is formed between the prongs 225, 235 such that the sleeve 230 is rotatable in the locking direction 294. Thus, when the sleeve 230 becomes free to rotate in the locking direction 294, the torsion spring 202 releases the stored mechanical energy and drives the sleeve 230 to the locking position, thereby setting the lost motion connection 206 in the first or locking state (FIG. 6*a*).

Figure 7B:
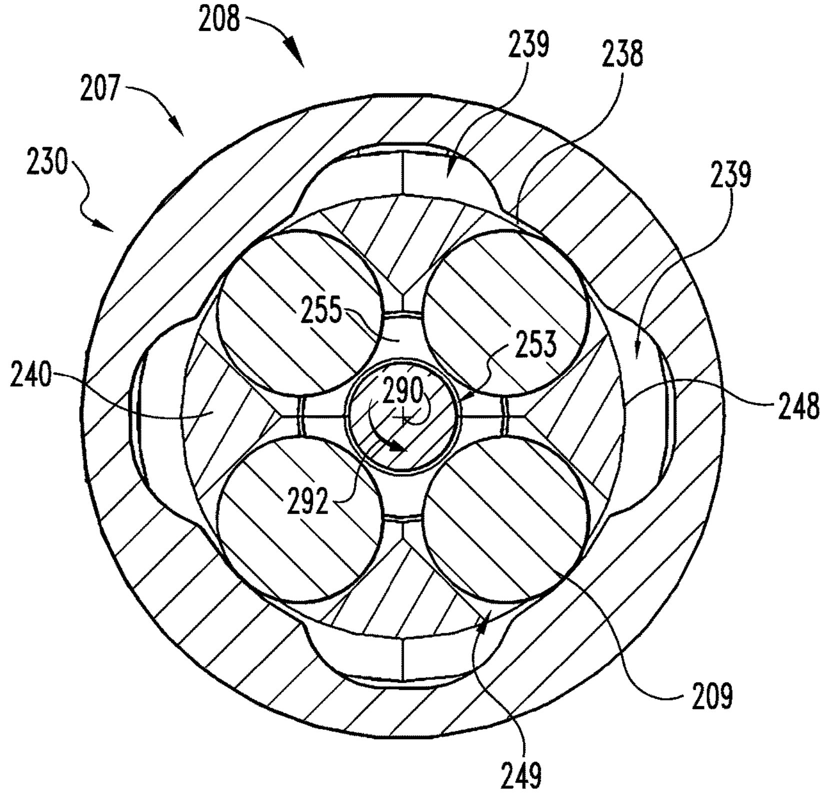
Figure 8B:
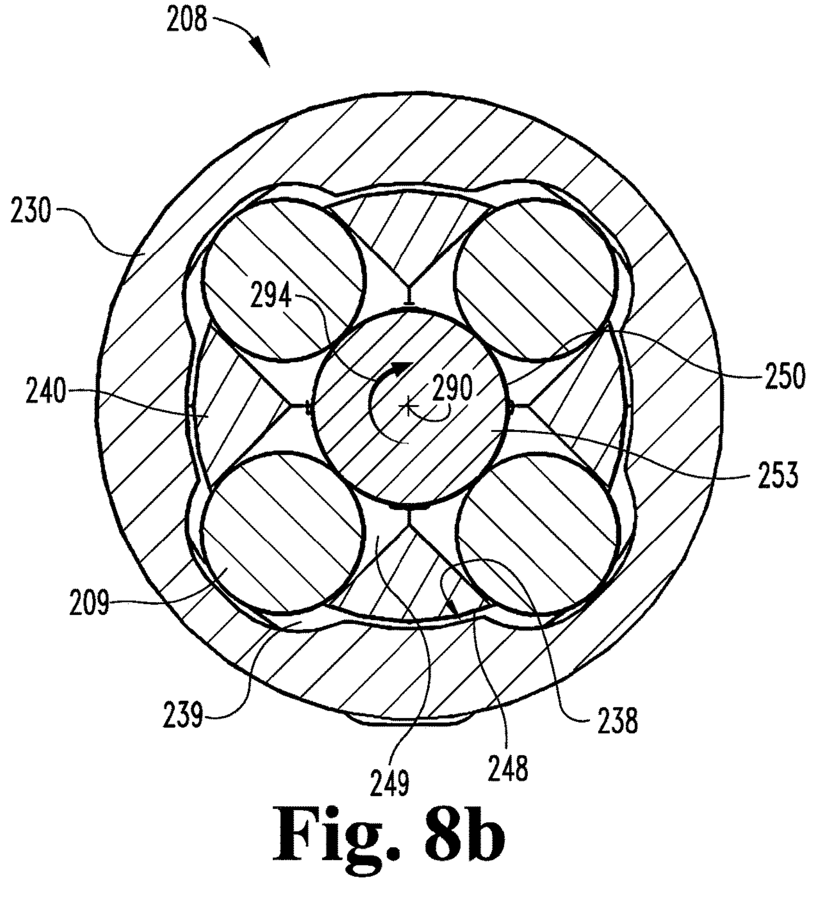

With additional reference to FIGS. 7 and 8, the locking assembly 208 is operable to selectively retain the plunger 250 in the extended position. As described in further detail below, pivotal movement of the keeper 130 from the closed position urges the plunger 250 toward the retracted position. When the plunger 250 is unable to move to the retracted position, interference between the nose 258 and the recess 138 prevent pivotal movement of the keeper 130. As such, the locking assembly 208 is operable to selectively retain the keeper 130 in the closed position.

FIG. 7 illustrates the plunger 250 in the extended position and the locking assembly 208 in the locking state. With the plunger 250 in the extended position, the circumferential channel 253 is aligned with the apertures 249 in the cage 240. As a result, the locking elements 209 are partially received in the apertures 249 and partially received within the cage chamber 245. In this state, movement of the plunger 250 in the proximal ($X^-$) direction causes the ramp 255 to urge the locking elements 209 radially outward.

As noted above, the locking state of the locking assembly 208 is defined by the locking position of the sleeve 230. With the sleeve 230 in the locking position, the inner surface 238 of the sleeve chamber 237 is aligned with the apertures 249, thereby preventing radially outward movement of the locking elements 209. As a result, interference between the locking elements 209 and the ramp 255 prevents the plunger 250 from moving to the proximal retracted position.

When the sleeve 230 is rotated in the unlocking direction 292, the recesses 239 become aligned with the apertures 249 as the sleeve 230 reaches the unlocking position. With the sleeve 230 in the unlocking position, the locking elements 209 are free to travel radially outward under the urging of the ramp 255. The plunger 250 is thus free to move in the proximal retracting direction, thereby defining an unlocking state of the locking assembly 208.

FIG. 8 illustrates the locking assembly 208 in the unlocking state and the plunger 250 in the retracted position. With the plunger 250 in the retracted position, the circumferential channel 253 is aligned with the apertures 249 and engaged with the locking elements 209. As a result, each of the locking elements 209 extends beyond the cage outer surface 248 into a corresponding one of the recesses 239. When the sleeve 230 is rotated in the locking direction 294, the recesses 239 urge the locking elements 209 radially inward. If radially inward movement of the locking elements 209 is blocked, for example by the enlarged diameter portion 254, the torsion spring 202 may urge the sleeve 230 to the locking position when the plunger 250 returns to the extended position.

Figure 9:
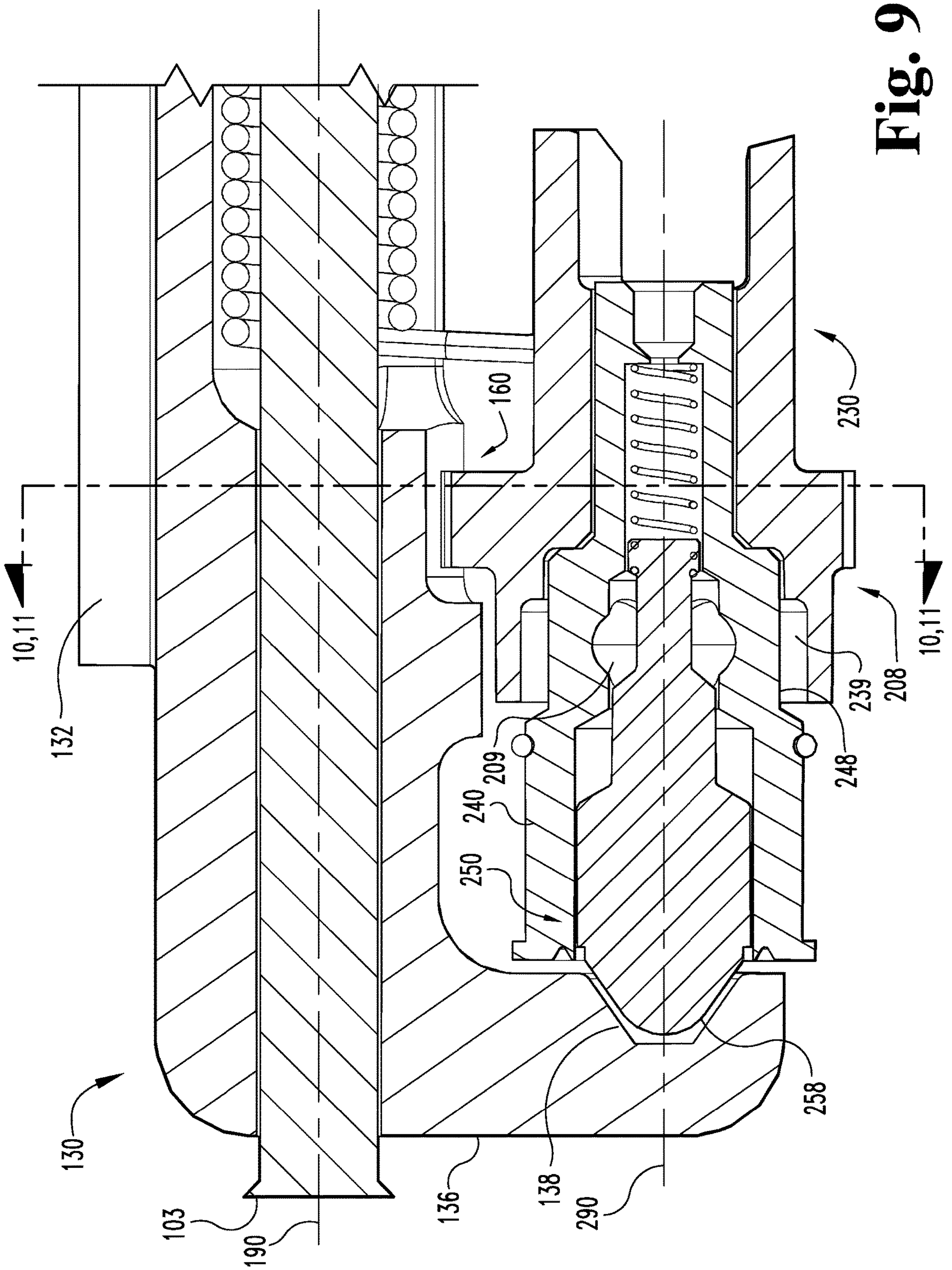
FIG. 9 is a cross-sectional illustration of a portion of the electric strike illustrated in FIG. 1.

FIG. 9 illustrates the keeper 130 in the closed position and engaged with the locking assembly 208. More specifically, the plunger 250 is in the extended position such that the nose 258 is engaged with the recess 138. In this state, pivotal movement of the keeper 130 in an opening direction causes the recess 138 to engage the nose 258, thereby urging the plunger 250 in the distal retracting direction. When the locking assembly 208 is in the unlocking state, the plunger 250 is free to retract, and pivotal movement of the keeper 130 is enabled. When in the locking state, the locking assembly 208 prevents retraction of the plunger 250, and interference between the nose 258 and the recess 138 prevents pivoting of the keeper 130. As such, the locking assembly 208 is operable to selectively retain the keeper 130 in the closed position by selectively retaining the plunger 250 in the extended position.

Figure 10:
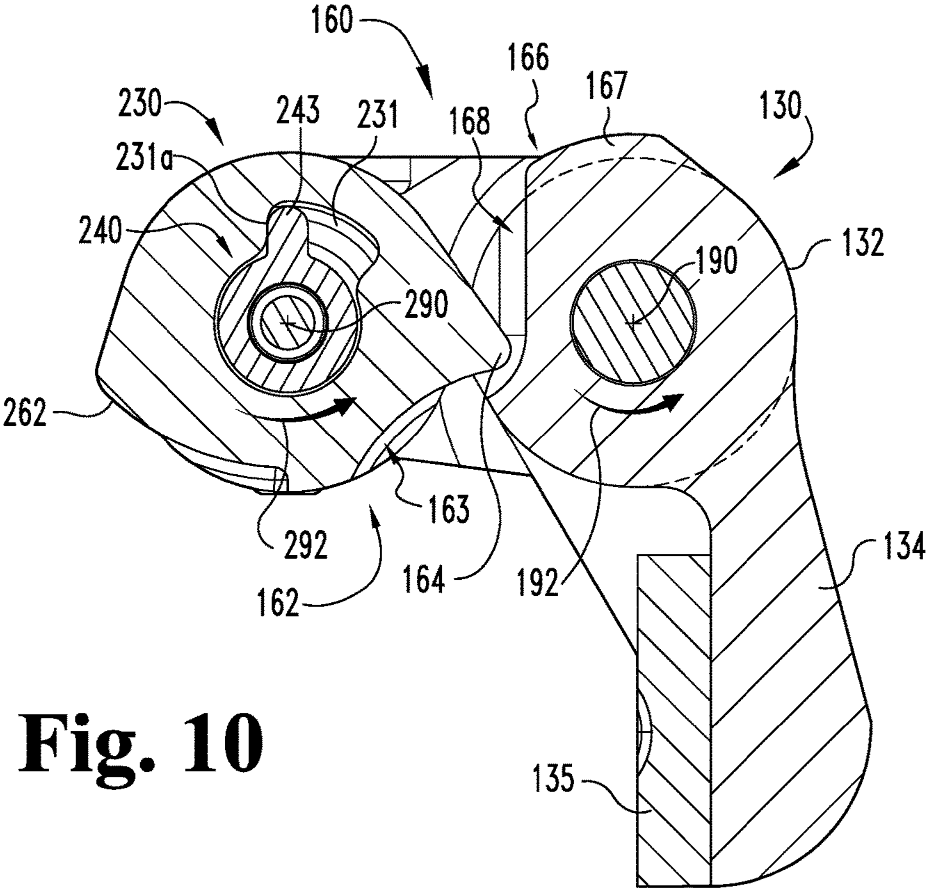
FIG. 10 is a cross-sectional illustration of a portion of the electric strike illustrated in FIG. 1, including an anti-tamper mechanism in a releasing state.
Figure 11:
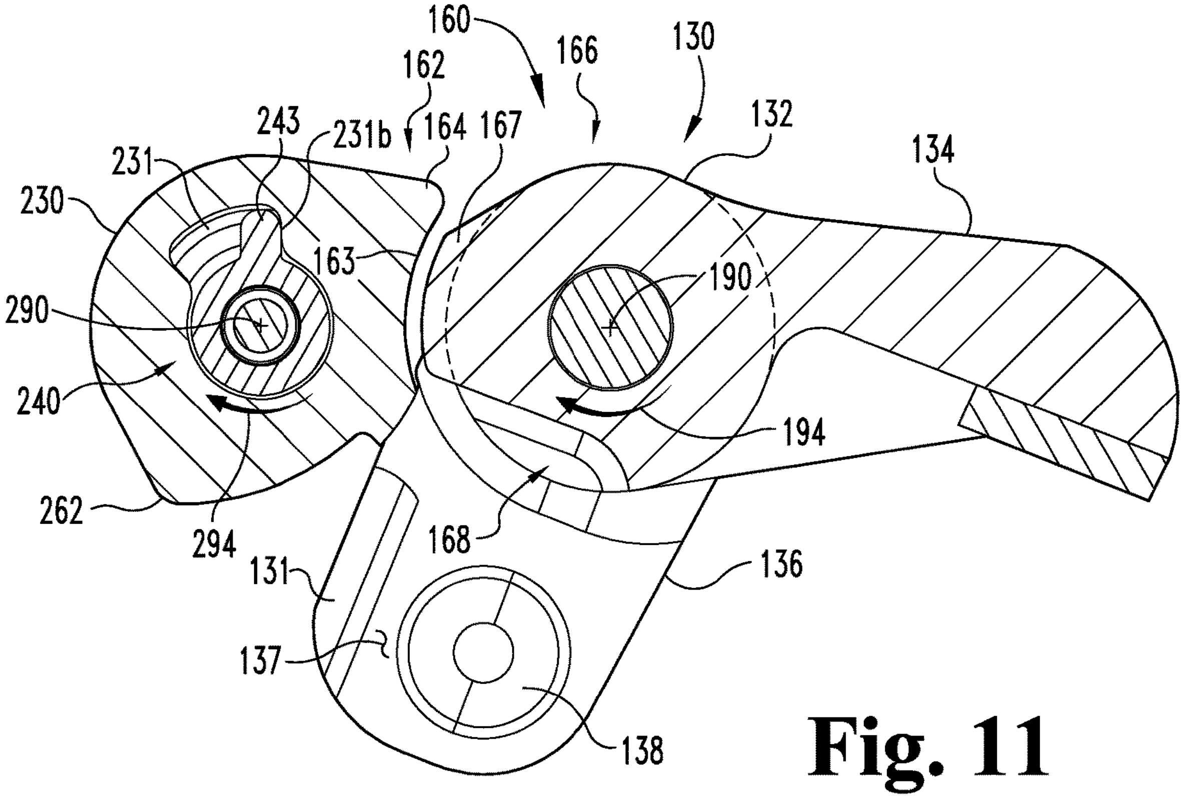
FIG. 11 is a cross-sectional illustration of a portion of the electric strike illustrated in FIG. 1, including the anti-tamper mechanism in a holding state.

With additional reference to FIGS. 10 and 11, as the keeper 130 pivots in an opening direction 192 from the closed position (FIG. 10) toward the open position (FIG. 11), the nose 258 of the plunger 250 travels along the recess 138 and into contact with the proximal surface 137 of the engagement arm 136, thereby urging the plunger 250 to the retracted position. As the keeper 130 continues to pivot in the opening direction 192, the arm 136 disengages from the nose 258, and the plunger 250 moves to the extended position under the force of the biasing spring 203. When the keeper 130 is subsequently pivoted in a closing direction 194, for example under the force of the torsion spring 139, a ramp 131 urges the nose 258 into contact with the proximal surface 137, thereby urging the plunger 250 to the retracted position. As the keeper 130 approaches the closed position, the recess 138 receives the nose 258 as the spring 203 urges the plunger 250 to the extended position. In this state, the locking assembly 208 is once again operable to selectively retain the keeper 130 in the closed position.

As will be appreciated, if the nose 258 does not engage the recess 138, the locking assembly 208 may be unable to retain the keeper 130 in the closed position. For example, if the locking assembly 208 were to move to the locking state with the keeper 130 in the open position, the arm 136 would be unable to move the plunger 250 to the retracted position, and the keeper 130 would be prevented from moving to the fully closed position. As a result, the nose 258 would not be engaged with the recess 138, and the keeper 130 would be free to pivot in the opening direction. Accordingly, certain embodiments may include an anti-tamper mechanism 160 operable to selectively retain the sleeve 230 in the unlocking position. In such forms, the anti-tamper mechanism 160 may be structured to retain the sleeve 230 in the unlocking position when the keeper 130 is in the open position.

The anti-tamper mechanism 160 includes a first engagement feature 162 formed on the body portion 234 of the sleeve 230 and a second engagement feature 166 formed on the body portion 132 of the keeper 130. The first engagement feature 162 includes an arcuate first recess 163 and a first protrusion 164 which partially defines the first recess 163. The second engagement feature 166 includes an arcuate second protrusion 167 which extends from the keeper body portion 132, and a second recess 168 formed in the keeper body portion 132.

FIG. 10 illustrates the keeper 130 in the closed position and the sleeve 230 in the locking position. In this state, the first protrusion 164 is received in the second recess 168, and the proximal spline 243 of the cage 240 is positioned adjacent one end 231*a* of the angular channel 231. As a result, the sleeve 230 is free to rotate in the unlocking direction 292, but is not operable to rotate in the locking direction 294. Additionally, with the sleeve 230 in the locking position, the locking assembly 208 prevents the keeper 130 from pivoting or rotating in the opening direction 192, thereby retaining the keeper 130 in the closed position.

As the sleeve 230 rotates about the axis 290 in the unlocking direction 292, the angular channel 231 travels along the proximal spline 243, and the first protrusion 164 passes through the second recess 168. When the sleeve 230 reaches the unlocking position (FIG. 11), the first recess 163 becomes aligned with the keeper body portion 132. Additionally, the spline 243 may engage the second end 231*b* of the angular channel 231, thereby preventing further rotation of the sleeve 230 in the unlocking direction 292. With the sleeve 230 in the unlocking position, the locking mechanism 208 is in the unlocking state, and the keeper 130 is free to rotate in the opening direction 192. As the keeper 130 rotates in the opening direction 192, the arcuate second protrusion 167 enters the arcuate first recess 163.

FIG. 11 illustrates the keeper 130 in the open position and the sleeve 230 in the unlocking position. In this state, the second protrusion 167 is received in the first recess 163, and the engagement features 162, 166 prevent the sleeve 230 from rotating in the locking direction 294. In other words, the anti-tamper mechanism 160 retains the sleeve 230 in the unlocking position when the keeper 130 is in the open position. If the actuator 210 is driven to return the transmission 220 to the lock-setting position before the keeper 130 is returned to the closed position, the lost motion connection 206 allows the sleeve 230 to remain in the unlocking position while mechanical energy is stored in the torsion spring 202.

As the keeper 130 rotates in the closing direction 194, the ramp 131 engages the nose 258, thereby urging the plunger 250 to the retracted position. With the plunger 250 in the retracted position, the second recess 168 becomes aligned with the first protrusion 164, and the sleeve 230 becomes free to rotate in the locking direction 294. When the keeper 130 returns to the closed position, the sleeve 230 is returned to the locking position under the force of the torsion spring 202. The anti-tamper mechanism 160 may be configured such that the recess 168 is aligned with the protrusion 164 when the nose 258 is engaged with proximal surface 137, such that the anti-tamper mechanism 160 retains the sleeve 230 in the unlocking position until the arm 136 urges the plunger 250 to retracted position. As a result, the sleeve 230 does not prematurely move to the locking position, which would prevent the nose 258 from being properly seated in the recess 138.

As is evident from the foregoing, the anti-tamper mechanism 160 retains the sleeve 230 in the unlocking position until the keeper 130 approaches the closed position. Thus, if a person attempts to tamper with the strike 100 by retaining the keeper 130 in the open position, the anti-tamper mechanism 160, torsion spring 202, and lost motion connection 206 ensure that the locking mechanism 208 does not retain the keeper 130 in the open position, but instead transitions to the locking state when the keeper 130 becomes free to return to the closed position.

Figure 12:
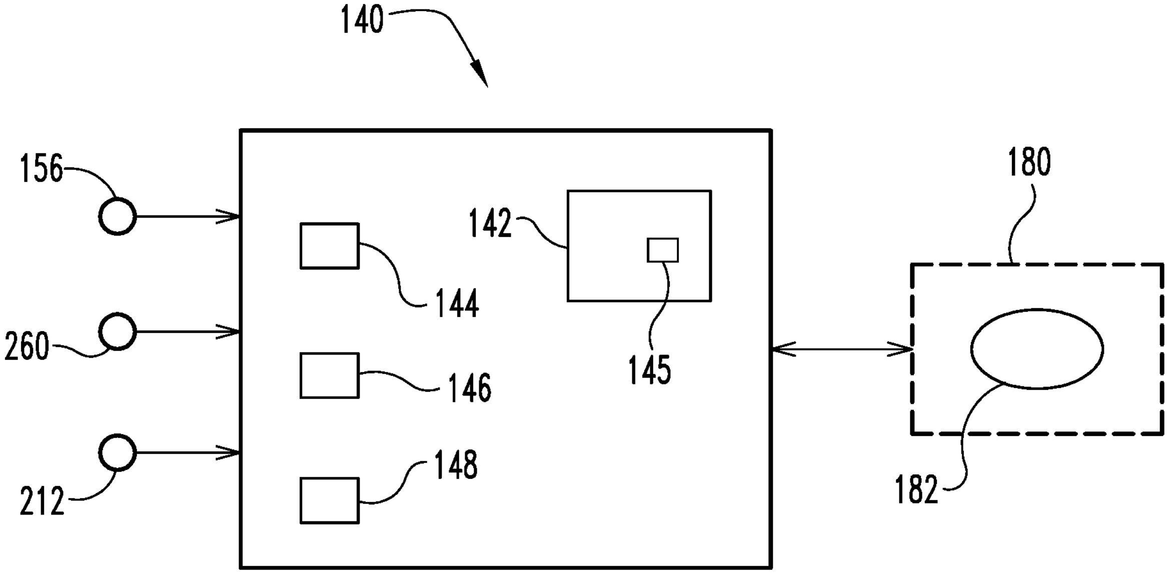
FIG. 12 is a schematic block diagram of a control assembly which may be utilized in the electric strike illustrated in FIG. 1.

With additional reference to FIG. 12, the control assembly 140 is in communication with the motor 212, and may further be in communication with the door position switch 156 and/or the lock status switch 260. The control assembly 140 is also connected to a power source such as a power line 182, which may form a portion of an access control system 180. The controller 142 may include a memory 145 including instructions and/or information to be accessed during operation of the strike 100. The control assembly 140 may further include a sensor 148 operable to detect the level of charge stored in the capacitor 144.

When the strike 100 is operating in the fail secure (FSE) or electric unlocking (EU) mode, the default state of the strike 100 is the locked state. In such forms, the access control system 180 generally maintains the power line 182 in a deactivated state, thereby maintaining the strike 100 in the default locked state, in which the locking mechanism 208 is in the locking state. When an authorized request to unlock the strike 100 is received, for example when an authorized credential is presented, the access control system 180 activates the power line 182, thereby supplying power to the strike 100. In response, the control assembly 140 charges the energy storage device 144 to a predetermined voltage level, and subsequently powers the actuator 210 to drive the motor 212 in the unlocking direction 292. As a result, the locking mechanism 208 transitions to the unlocking state, thereby transitioning the strike 100 to the non-default unlocked state. When the power line 182 is subsequently deactivated, for example after a predetermined amount of time, the control assembly 140 discharges the energy stored in the energy storage device 144 to drive the motor 212 in the locking direction. As a result, the locking mechanism 208 transitions to the locking state, thereby returning the strike 100 to the default locked state.

When the strike 100 is operating in the fail safe (FS) or electric locking (EL) mode, the default state of the strike 100 is the unlocked state. In such forms, the access control system 180 generally maintains the power line 182 in an activated state, thereby maintaining the strike 100 in the non-default locked state, in which the locking mechanism 208 is in the locking state. When an authorized request to unlock the strike 100 is received, for example when an authorized credential is presented, the access control system 180 deactivates the power line 182, thereby removing power from the strike 100. In response, the control assembly 140 discharges energy stored in the energy storage device 144 to power the actuator 210 to drive the motor 212 in the unlocking direction 292. As a result, the locking mechanism 208 transitions to the unlocking state, thereby transitioning the strike 100 to the default unlocked state. When the power line 182 is subsequently reactivated, for example after a predetermined amount of time, the control assembly 140 charges the energy storage device 144 to a predetermined voltage level, and subsequently powers the actuator 210 to drive the motor 212 in the locking direction 294. As a result, the locking mechanism 208 transitions to the locking state, thereby returning the strike 100 to the non-default locked state.

Figure 13:
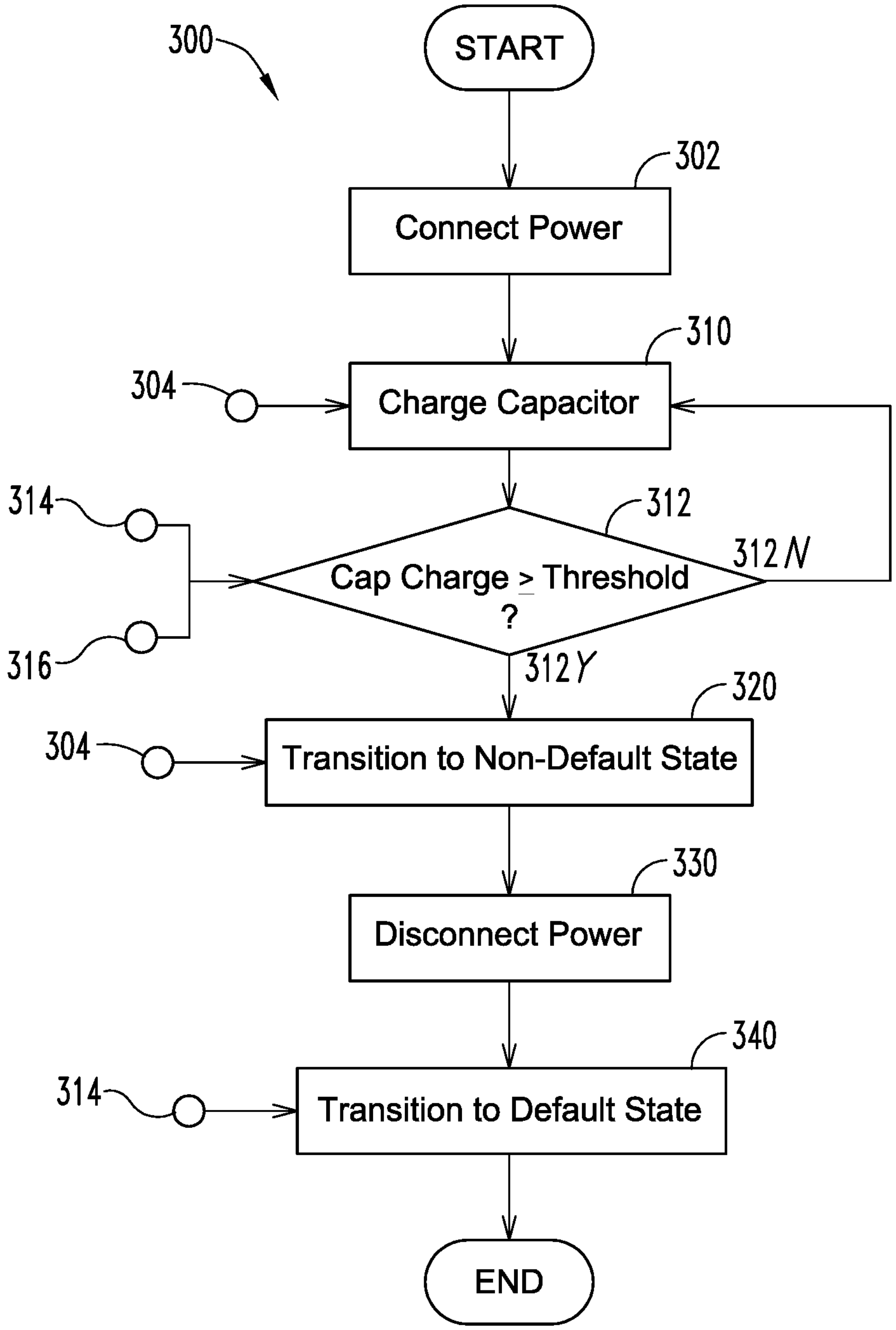
FIG. 13 is a schematic flow diagram of a process which may be utilized in connection with the electric strike illustrated in FIG. 1.

With additional reference to FIG. 13, an exemplary process 300 which may be performed using the electric strike 100 is illustrated. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 300 may be performed wholly by the controller 142, access control system 180, and/or the actuating assembly 200, or that the operations or steps may be distributed among one or more of the elements and/or additional devices or systems which are not specifically illustrated in FIGS. 1-12.

At the start of the process 300, the strike 100 is not connected to line power 182, and the actuating assembly 200 is in an unpowered or default state. As will be appreciated, the unpowered or default state may be the locking state or the unlocking state based upon the operating mode of the strike 100. For example, the default state may be the locked state when the strike 100 is operating in the EU mode, and may be the unlocked state when the strike 100 is operating in the EL mode. The process 300 may begin with an operation 302, which includes supplying power to the strike 100 via the power line 182.

With the power connected, the process 300 may continue to an operation 310, which includes storing energy in the energy storage device 144. For example, the operation 310 may include receiving line power 304 from the power line 182, conditioning the line power 304, and directing the conditioned power to the capacitor 144. The process 300 also includes a conditional 312, which may be performed as the capacitor 144 is being charged in the operation 310. In the conditional 312, the controller 142 compares the current charge 314 in the capacitor 144 to a threshold charge 316, and determines whether the current charge 314 is greater than the threshold charge 316. While other forms are contemplated, in the illustrated embodiment, the threshold charge 316 is a charge sufficient to transition the actuating assembly 200 from the non-default state to the default state. The threshold charge 316 may be stored in the memory 145, and may be set during an installation or maintenance procedure. In certain embodiments, the value of the threshold charge 316 may be updated or set by the access control system 180. If the current charge 314 is less than the threshold charge 316 (312N), the process 300 may return to the operation 310 to continue charging the capacitor 144.

When the current charge 314 is greater than or equal to the threshold charge 316 (312Y), the process 300 may continue to an operation 320. The operation 320 includes transitioning the actuating assembly 200 from the default state to the non-default state. For example, if the mode selector 146 has set the strike 100 to the EL or fail safe mode, the operation 320 includes transitioning the actuating assembly 200 from the unlocked state to the locked state by driving the motor 212 in the locking direction 294. Conversely, if the mode selector 146 has set the strike 100 to the EU or fail secure mode, the operation 320 includes transitioning the actuating assembly 200 from the locked state to the unlocked state by driving the motor 212 in the unlocking direction 292. Additionally, the energy required to transition the actuating assembly 200 from the default state to the non-default state in the operation 320 is drawn from the power line 182, thereby maintaining the current charge 314 in the capacitor 144.

Once the actuating assembly 200 has been transitioned to the non-default state in the operation 320, the power line 182 may be disconnected by the access control system 180 in an operation 330. When the power line 182 is disconnected, the process 300 may proceed to an operation 340, which includes transitioning the actuating assembly 200 from the non-default state to the default state using the energy 314 stored in the capacitor 144. Due to the fact that the capacitor charge 314 is greater than the threshold charge 316 required to transition the actuating assembly 200 to the non-default state, the operation 340 may be completed despite the fact that the strike 100 is no longer connected to the power line 182.

As will be appreciated by those having skill in the art, if the power line 182 is disconnected before the capacitor charge 314 exceeds the threshold charge 316, the operation 320 may be skipped. In other words, if the operation 330 occurs before the conditional 312 is satisfied, the actuating assembly 200 will not be transitioned to the non-default state. As a result, the actuating assembly remains in the default state, thereby satisfying the selected one of the "fail safe" or "fail secure" requirements.

In order to transition the actuating assembly 200 between the default and non-default positions, the controller 142 may provide the actuator 210 with current of opposite polarities in the operations 320, 340, thereby driving the motor 212 in opposite directions during the operations 320, 340. For example, the controller 142 may be structured to output a positively charged current from the line power 182 during the operation 320, and to output a negatively charged current from the capacitor 144 during the operation 340.

Additionally, the control assembly 140 may be structured to drive the actuator 210 such that the sleeve 230 rotates to a position in which a corresponding end 231*a*, 231*b* of the angular channel 231 engages the proximal spline 243, thereby ensuring that the sleeve 230 has reached the appropriate locking or unlocking position. For example, when transitioning the actuating assembly 200 from the locking state (FIG. 10) to the unlocking state (FIG. 11), the controller 142 may drive the motor 212 until the second end 231*b* of the angular channel 231 engages the proximal spline 243. In certain embodiments, the controller 142 may drive the motor 212 for a predetermined amount of time or for a predetermined number of steps sufficient to ensure that the sleeve 230 has reached the desired position. In other embodiments, the controller 142 may drive the motor 212 until the current drawn by the actuator 210 spikes, thereby indicating that the motor 212 has stalled. In further embodiments, the controller 142 may drive the actuator 210 until the lock status switch 260 indicates that the sleeve 230 has reached the desired position, or for a predetermined amount of time thereafter.

Furthermore, the mode selector 146 may be structured to selectively reverse the polarity of the current that is output from the controller 142. The mode selector 146 may maintain the polarity of the current from the controller 142 when in a first mode, and may reverse the polarity of the current from the controller 142 when in a second mode. As a result, the polarity of the current supplied to the motor in the operations 320, 340, and thus the direction in which the motor 212 rotates during these operations, may be selected by adjusting the state of the mode selector 146. In the illustrated form, the mode selector 146 is provided in the form of a DIP switch connected between the controller 142 and the motor 212. It is also contemplated that the mode selector 146 may be provided in another form, such as instructions and/or firmware stored in the memory 145. In such embodiments, the mode selector 146 may be adjusted by the access control system 180 to remotely set the EL/EU mode of the strike 100.

Figure 14:
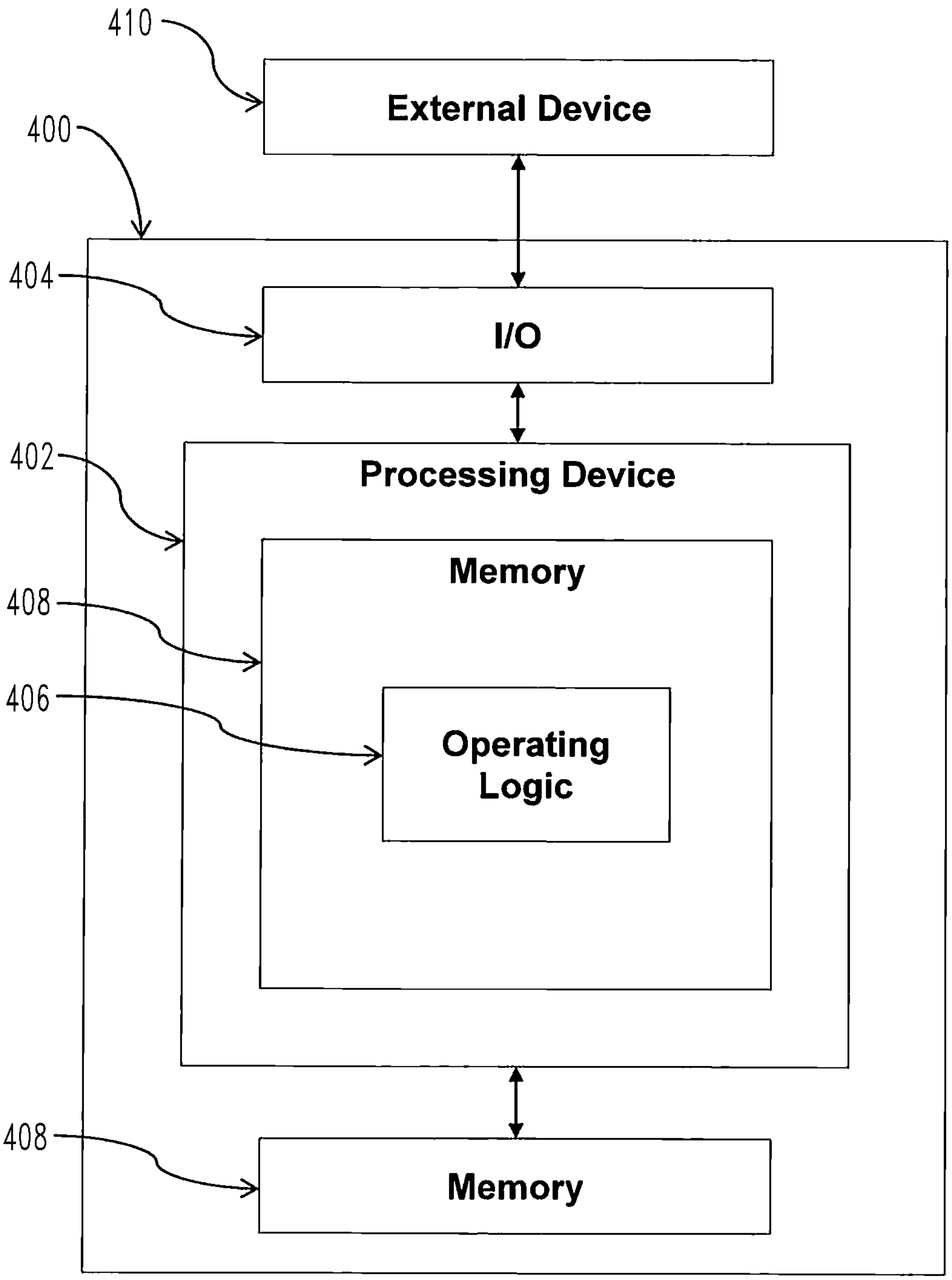
FIG. 14 is a schematic block diagram of a computing device which may be utilized in the electric strike illustrated in FIG. 1.

FIG. 14 is a schematic block diagram of a computing device 400. The computing device 400 is one example of a computer, server, mobile device, reader device, or equipment configuration which may be utilized in connection with the strike 100 illustrated in FIG. 1. The computing device 400 includes a processing device 402, an input/output device 404, memory 406, and operating logic 408. Furthermore, the computing device 400 communicates with one or more external devices 410.

The input/output device 404 allows the computing device 400 to communicate with the external device 410. For example, the input/output device 404 may be a network adapter, network card, interface, or a port (e.g., a USB port, serial port, parallel port, an analog port, a digital port, VGA, DVI, HDMI, FireWire, CAT 5, or any other type of port or interface). The input/output device 404 may be comprised of hardware, software, and/or firmware. It is contemplated that the input/output device 404 includes more than one of these adapters, cards, or ports.

The external device 410 may be any type of device that allows data to be inputted or outputted from the computing device 400. For example, the external device 410 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 410 may be integrated into the computing device 400. It is further contemplated that there may be more than one external device in communication with the computing device 400.

The processing device 402 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 402 with multiple processing units, distributed, pipelined, and/or parallel processing can be utilized as appropriate. The processing device 402 may be dedicated to performance of just the operations described herein or may be utilized in one or more additional applications. In the depicted form, the processing device 402 is of a programmable variety that executes algorithms and processes data in accordance with operating logic 408 as defined by programming instructions (such as software or firmware) stored in memory 406. Alternatively or additionally, the operating logic 408 for processing device 402 is at least partially defined by hardwired logic or other hardware. The processing device 402 can be comprised of one or more components of any type suitable to process the signals received from input/output device 404 or elsewhere, and provide desired output signals. Such components may include digital circuitry, analog circuitry, or a combination of both.

The memory 406 may be of one or more types, such as a solid-state variety, electromagnetic variety, optical variety, or a combination of these forms. Furthermore, the memory 406 can be volatile, nonvolatile, or a combination of these types, and some or all of memory 406 can be of a portable variety, such as a disk, tape, memory stick, cartridge, or the like. In addition, the memory 406 can store data that is manipulated by the operating logic 408 of the processing device 402, such as data representative of signals received from and/or sent to the input/output device 404 in addition to or in lieu of storing programming instructions defining the operating logic 408, just to name one example. As shown in FIG. 4, the memory 406 may be included with the processing device 402 and/or coupled to the processing device 402.

The processes in the present application may be implemented in the operating logic 408 as operations by software, hardware, artificial intelligence, fuzzy logic, or any combination thereof, or at least partially performed by a user or operator. In certain embodiments, units represent software elements as a computer program encoded on a non-transitory computer readable medium, wherein the controller 142 performs the described operations when executing the computer program.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An electric strike, comprising:

a housing;

a keeper pivotally mounted in the housing, the keeper having an open position and a closed position;

a lock assembly having a locking state in which the lock assembly retains keeper in the closed position and an unlocking state in which the keeper is pivotable toward the open position, wherein the lock assembly includes a sleeve having a locking position defining the locking state and an unlocking position defining the unlocking state;

an electric driver operable to move the sleeve between the locking position and the unlocking position; and an anti-tamper mechanism structured to retain the sleeve in the unlocking position when the keeper is in the open position, wherein the anti-tamper mechanism comprises first and second engagement features, wherein the second engagement feature is structured to retain the sleeve in the unlocking position when engaged with the first engagement feature, and wherein the first engagement feature is configured to disengage the second engagement feature in response to the keeper approaching the closed position.

2. The electric strike of claim 1, wherein the first engagement feature is on the keeper; and a wherein the second engagement feature is on the sleeve.

3. The electric strike of claim 1, wherein the sleeve is configured to rotate between the locking position and the unlocking position.

4. An electric strike, comprising:

a housing;

a keeper pivotally mounted in the housing, the keeper having an open position and a closed position;

a lock assembly having a locking state in which the lock assembly retains keeper in the closed position and an unlocking state in which the keeper is pivotable toward the open position, wherein the lock assembly includes a sleeve having a locking position defining the locking state and an unlocking position defining the unlocking state;

a spring urging the sleeve toward the locking position;

an electric driver operable to move the sleeve between the locking position and the unlocking position; and an anti-tamper mechanism structured to retain the sleeve in the unlocking position when the keeper is in the open position.

5. The electric strike of claim 4, wherein the anti-tamper mechanism comprises a first engagement feature i-s structured to engage a second engagement feature when the sleeve is in the unlocking position and the keeper is in the open position;

wherein the first engagement feature is configured to disengage from the second engagement feature in response to the keeper approaching the closed position; and wherein the second engagement feature is structured to retain the sleeve in the unlocking position when engaged with the first engagement feature.

6. An electric strike, comprising:

a housing;

a keeper pivotally mounted in the housing, the keeper having an open position and a closed position;

a lock assembly having a locking state in which the lock assembly retains keeper in the closed position and an unlocking state in which the keeper is pivotable toward the open position, wherein the lock assembly includes a sleeve having a locking position defining the locking state and an unlocking position defining the unlocking state;

an electric driver operable to move the sleeve between the locking position and the unlocking position; and an anti-tamper mechanism structured to retain the sleeve in the unlocking position when the keeper is in the open position; and wherein the sleeve is connected with the electric driver via a lost motion connection configured to permit the electric driver to perform a relocking movement while the anti-tamper mechanism retains the sleeve in the unlocking position.

7. The electric strike of claim 6, further comprising a spring configured to drive the sleeve from the unlocking position to the locking position when the anti-tamper mechanism permits such movement of the sleeve.

8. The electric strike of claim 6, wherein the sleeve is configured to rotate between the locking position and the unlocking position; and wherein the lost motion connection is a lost rotational motion connection.

9. The electric strike of claim 8, wherein the lost rotational motion connection comprises a first forked portion and a second forked portion interleaved with the first forked portion such that gaps are formed between first prongs of the first forked portion and second prongs of the second forked portion.

10. An electric strike, comprising:

a housing;

a keeper pivotally mounted in the housing, wherein the keeper is biased toward a closed position and is selectively pivotable to an open position;

a lock assembly having a locking state in which the lock assembly retains the keeper in the closed position and an unlocking state in which the keeper is pivotable toward the open position;

a sleeve having a locking position defining the locking state and an unlocking position defining the unlocking state;

an electric driver operable to move the sleeve between the locking position and the unlocking position; and a spring urging the sleeve toward the locking position.

11. The electric strike of claim 10, wherein the sleeve is configured to rotate between the locking position and the unlocking position.

12. The electric strike of claim 10, further comprising a lost motion connection between the sleeve and the electric driver.

13. The electric strike of claim 10, further comprising an anti-tamper mechanism structured to retain the sleeve in the unlocking position when the keeper is in the open position.

14. The electric strike of claim 13, wherein the anti-tamper mechanism comprises:

a first engagement feature formed on the keeper; and a second engagement feature formed on the sleeve.

15. The electric strike of claim 14, wherein the first engagement feature is structured to engage the second engagement feature when the sleeve is in the unlocking position and the keeper is in the open position;

wherein the first engagement feature is configured to disengage from the second engagement feature in response to the keeper approaching the closed position; and wherein the second engagement feature is structured to retain the sleeve in the unlocking position when engaged with the first engagement feature.

16. An electric strike, comprising:

a housing;

a keeper pivotally mounted in the housing, wherein the keeper is biased toward a closed position and is selectively pivotable to an open position;

a lock assembly having a locking state in which the lock assembly retains the keeper in the closed position and an unlocking state in which the keeper is pivotable toward the open position;

an electric driver operable to transition the lock assembly between the locking state and the unlocking state; and an anti-tamper mechanism configured to retain the lock assembly in the unlocking state when the keeper is in the open position via engagement of a first engagement feature on the keeper with a second engagement feature on the lock assembly, and wherein the first engagement feature is configured to disengage the second engagement feature in response to the keeper approaching the closed position.

17. The electric strike of claim 16, wherein the lock assembly is connected with the electric driver via a lost motion connection and a spring.

18. An electric strike, comprising:

a housing;

a keeper pivotally mounted in the housing, wherein the keeper is biased toward a closed position and is selectively pivotable to an open position;

a lock assembly having a locking state in which the lock assembly retains the keeper in the closed position and an unlocking state in which the keeper is pivotable toward the open position;

an electric driver operable to transition the lock assembly between the locking state and the unlocking state; and an anti-tamper mechanism configured to retain the lock assembly in the unlocking state when the keeper is in the open position, and to permit the lock assembly to transition from the unlocking state to the locking state when the keeper is in the closed position;

wherein the lock assembly is connected with the electric driver via a lost motion connection and a spring;

wherein, with the keeper in the open position, the lost motion connection permits the electric driver to perform a relocking movement while the lock assembly remains in the unlocking state; and wherein, with the keeper in the closed position, the spring is operable to drive the locking assembly from the unlocking state to the locking state.

19. The electric strike of claim 18, wherein the anti-tamper mechanism comprises:

a first engagement feature formed on the keeper; and a second engagement feature formed on the lock assembly.

20. The electric strike of claim 19, wherein the first engagement feature is structured to engage the second engagement feature when the lock assembly is in the unlocking state and the keeper is in the open position;

wherein the first engagement feature is configured to disengage from the second engagement feature in response to the keeper approaching the closed position; and wherein the second engagement feature is structured to retain the lock assembly in the unlocking state when engaged with the first engagement feature.

* * * * *